United States Patent [19]

den Haan et al.

[11] Patent Number: 5,036,459
[45] Date of Patent: Jul. 30, 1991

[54] MULTI-PROCESSOR COMPUTER SYSTEM WITH DISTRIBUTED MEMORY AND AN INTERPROCESSOR COMMUNICATION MECHANISM, AND METHOD FOR OPERATING SUCH MECHANISM

[75] Inventors: Petrus A. M. den Haan; Franciscus P. M. Hopmans, both of Eindhoven, Netherlands

[73] Assignee: U.S. Philips Corporation, New York, N.Y.

[21] Appl. No.: 321,412

[22] Filed: Mar. 9, 1989

[51] Int. Cl.$^5$ .............................................. G06F 15/16
[52] U.S. Cl. .................................. 364/200; 364/284; 364/284.3
[58] Field of Search ... 364/200 MS File, 900 MS File

[56] References Cited

U.S. PATENT DOCUMENTS

| | | | |
|---|---|---|---|
| 4,214,305 | 7/1980 | Tokita et al. | 364/200 |
| 4,543,627 | 9/1985 | Schwab | 364/200 |
| 4,630,196 | 12/1986 | Bednar, Jr. et al. | 364/200 |
| 4,677,588 | 6/1987 | Benjamin et al. | 364/900 |
| 4,750,165 | 6/1988 | Champagne et al. | 370/24 |
| 4,809,267 | 2/1989 | Higuchi et al. | 370/85.15 |

OTHER PUBLICATIONS

Bronnenberg et al., "The Architechure of DOOM", Proc. ESPRIT-415, Summerschool 1986, Springer Lecture Notes in Comp. Sci, 1987, pp. 227-269.
den Haan et al., "Efficient Message Passing in Parallel Systems with Limited Memory", CONPAR 88 (Manchester UK) pp. 42-49.

*Primary Examiner*—Michael R. Fleming
*Assistant Examiner*—Debra A. Chun
*Attorney, Agent, or Firm*—Anne E. Barschall

[57] ABSTRACT

A method and process for operating an interprocess communication mechanism in a multi processor computer system are described. If a sender node needs sending a message to a receiver node, it accesses the latter for available storage space. If available, the message is transferred and the sender node may resume processing. If nonavailable the transferring is deferred. In either case the message is queued to any message either awaiting processing at the receiver node or awaiting transfer, in that at the instant when such transfer was necessary, no storage space had been available. If the receiver node wants to process a message, it accesses the least recent item of the message queue and unlinks it, while belated transferring is now executed, if necessary.

Thereupon the original sender node was still kept waiting, it is now allowed to resume processing. Generally only two communication operations are required per message. Only in case of inavailability of storage space, the message in question needs four communication operations.

9 Claims, 2 Drawing Sheets

MULTI-PROCESSOR COMPUTER SYSTEM WITH DISTRIBUTED MEMORY AND AN INTERPROCESSOR COMMUNICATION MECHANISM, AND METHOD FOR OPERATING SUCH MECHANISM

BACKGROUND OF THE INVENTION

The invention relates to a multiprocessor computer system with distributed memory and an interprocessor communication mechanism, for operating as a parallel machine. Particular properties are:
contains up to 1000 processing elements(nodes), or even more,
connected via a message switching network (not fully connected),
the network will transport a message from source to destination without processor intervention,
only distributed memory, no shared memory,
outside world communication via gateway(s),
internal communication not restricted by standardized protocols.
All of the above terms are standard and no further definition is presented.

EXEMPLARY PRIOR ART

The architecture of such a system has been described in W. J. H. J. Bronnenberg, et al. "The architecture of DOOM," Proc. ESPRIT-415 Summerschool 1986, in Springer Lecture Notes in Computer Science, 1987, pp. 227-269. On account of the distributed memory, two processes running on different nodes must communicate by copying information present at the source node to the memory allocated to the destination node.

SUMMARY OF THE INVENTION

Such copying can be effected by message transfer between the source and the destination nodes, as governed by the following two communication primitives (or basic operations) only, each such primitive having a meaning, as follows:
a. send a message m to process R:
  m is delivered to R and the executing process (sender) is delayed until R has accepted m; here, m and r are parameters of the primitive;
b. accept a message:
  Extract a message from the queue of the executing process (receiver).
  When no message: delay receiver until a message arrives.
  When more messages: first come first served order.
  This primitive has no parameters, the accessing of the queue involoved is implicit to the process executing the -accept- primitive.

In the remainder of the description, all entities and statements appearing in a program have been printed in typewriter character font, whereas all other characters have been printed in Roman font (among other differences, the latter has flexible spacing of the character fields).

In first instance, each sender may send only a single message and may only send a subsequent message after the preceding message has been accepted. Hereinafter a generalization will be explained, though. Each receiver, on the other hand, may have a multiplicity of messages waiting for further execution.

Among other things, it is an object of the present invention to improve the referenced computer system for allowing a flexible communication organization that is robust against shortage of memory at a destination node, but on the other hand requires as few network transactions as reasonably considered possible. The invention uses internal queue linking at the destination node that is only selectively supplemented by external queue linking at the source node in case of memory shortage at the destination node, which supplementing is thus only effected as an emergency measure. The two concepts of internal queue linking and external queue linking will be discussed hereinafter. According to one aspect of the invention, the object is realized in that it provides a method for operating an interprocessor communication mechanism in a multiprocessor computer system with distributed memory, said method for transmitting a message from a sender node to a receiver node comprising the steps of:

1. in the sender node having a first local communication process, delivering the message by a sender process for thereupon addressing a second local communication process in the receiver node with a queuing request for queuing said message;

2. in the second local communication process of the receiver node detecting the queuing request and inspecting a first local memory facility as to its availability or non-availability for storing said message; in case of said availability receiving and queuing said message to a local position of a waiting queue in said first local memory facility and signalling a receiver process of the receiving node arrival of said message and allowing said sender process to continue; but in case of said non-availability deferring said receiving thereby retaining said message in a second, non-local position of the waiting queue in a second local memory facility of the sender node and signaling the receiving process pendency of said message; while in either said availability or said non-availability signaling to a first applicable local communication process of the node containing a most recent pending message of the queue a link indication identifying the node containing its next successor message in the queue.

3. in the receiver node by said receiver process after waiting for signalization of either said arrival or said pendency accessing a least recently activated message of the waiting queue and detecting whether it is local or non-local; in case of local dequeueing and accepting from said waiting queue the message therein for processing by said receiver process; in case of non-local, dequeueing the message and controlling the second applicable communication process of the node containing the least recent pending message of the queue for presenting the latter message and upon presentation accepting the message presented for processing by said receiver process while deactivating the message thus received from the queue; and after said processing reaccessing the queue until empty;

4. in the receiver node after said accepting transmitting an acknowledge signal to the second applicable local communication process for allowing its nodes's sender process to continue.

Such a method may be advantageously realized in a multiprocessor computer system a multiprocess computer system with distributed memory and an interprocessor communication mechanism, said system comprising for transmitting a message from a sender node to a receiver node:

1. in the sender node having first local communication process means, sender process means for delivering a message, said sender node having addressing means for then addressing a second local communication process means in the receiver node with a queuing request for queuing said message;
2. in said second communication process means first detecting means for detecting said queuing request cum inspection means for inspecting a first local memory facility of the receiver node as to its availability or non-availability for storing said message, local queuing control means fed by said inspection means for in case of said availability receiving and queuing said message to a local position of a waiting queue means in said first local memory facility and generating an arrival signal for said message to a receiver process means of said receiver node and sending an acknowledge signal to said sender node for allowing said sender process means to continue; non-local queueing control means fed by said inspection means for in case of said non-availability arresting and queueing said message to a non-local position of the waiting queue means in a second local memory facility of the sender node and generating a pendency signal with respect to the latter message to the receiver process means; and chaining means for under control of any output signal of said detecting means signalling to a first applicable local communication process means of any node containing the most recent preceding message of the queue a link indication signal identifying the node containing its next successor message in the queue;
3. second detecting means in the receiver process means of said receiver node for after waiting for signalization of either said arrival or said pendency, accessing a least recently activated position of the waiting queue means and detecting whether it is local or non-local; first dequeueing means fed by said second detecting means for in case of local dequeueing and accepting from said waiting queue means, the message in said least recently activated position for processing in said receiver process means; second dequeueing means fed by said second detecting means for in case of non-local dequeueing the message in said least recently activated position and controlling a second applicable local communication process means of any node containing the least recent pending message of the queue for presenting the latter message, and upon said presenting accepting the message presented for processing by said receiver process means while deactivating the message thus received from the queue and after said processing reactivating said second detection means until the queue be empty;
4. acknowledge means in the receiver node for after said accepting transmitting an acknowledge signal to the second applicable local communication process means for allowing its node's sender process means to continue.

Various advantageous further aspects of the invention have been recited in dependent claims.

BRIEF DESCRIPTION OF THE FIGURES

Hereinafter, the invention will be explained in detail with respect to the following Figures.

DESCRIPTION OF A HARDWARE ENVIRONMENT

Figure 1:
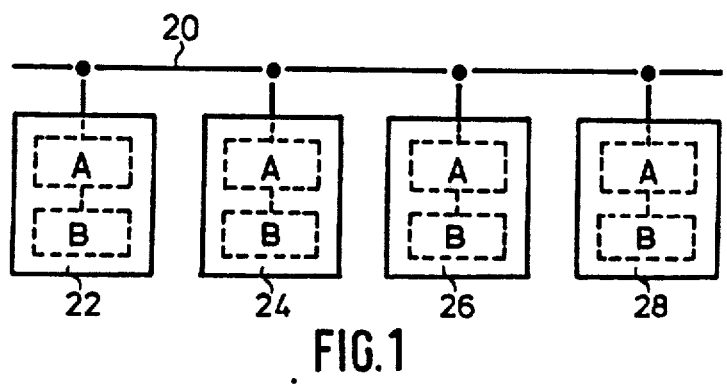
FIG. 1 is an elementary block diagram of a multiprocessor computer system according to the invention.

FIG. 1 is an elementary block diagram of a multiprocessor computer system according to the invention. The network is executed as a bus 20 that links stations or nodes 22 . . . 28. Other network systems can likewise be used inasmuch as the invention does not relate to the bus-linked limitations of the communication. For brevity, therefore, no details are presented as regarding voltage levels, bit shapes, word formats, arbiter protocol and message formats, including preamble, postamble, error handling protocols, message handshaking on any level lower than the complete function of the message itself. Communication with the external world has been detailed neither.

Now, any station is connected to the network by means of a communication process A. The function of the station other than communication proper is symbolized by process B. The nature of the latter process has not been detailed. The stations may be equal or different with respect to each other. They may have corresponding functions, such as in an array computer, or be specialized. A station may have one processor in a multi-process organization, or itself be a multiprocessor entity. In the latter case each process shown may be assigned to a separate processor. Each node or station, in addition to processor hardware, not shown separately, has privy memory not directly accessible by any other station. For brevity, station hardware has not been detailed further, inasmuch as it may be realized by standard parts. For example, message buffers are straightforwardly realized in RAM.

DESCRIPTION OF LANGUAGE COMMUNICATION PROTOCOLS

A communication protocol implements the communication primitives of the programming language in terms of the communication primitives offered by the machine.

The basic primitives of our language model provide synchronous message passing between processes. To communicate with other processes only the -send-and -accept- primitives are used, which are formulated as follows in a Pascal like notation. Herein the general concepts of the Pascal computer language have been considered standard knowledge in the field of computer science.

```
proc Send(ref prc,ref msg)
proc Accept( ):ref msg
```

Herein, the -send- primitive is an operation with two parameters. The first one refers to or identifies a particular process, the second one identifies a particular message. The -accept- primitive results in the identification of a message, this latter not being a parameter value of the -accept- primitive. As usual, -ref- indicates a type of an entry which follows thereafter.

Before executing a -send- primitive a process has to prepare a message buffer (referred to by the -ref msg- type; see Process and Message Representation) containing the data of the message. The primitive -Send(d, m)- delivers the message -m- to the destination process -d- and terminates when the message is accepted by the destination process. The process location is implied by the process identification. Various sender processes may send concurrently to a single destination process, hence the communication shows a many-to-one behaviour, requiring a message queueing mechanism.

The -accept- primitive returns to the executing process a reference to a buffer containing a message that has arrived for this process. Messages are accepted in first-come first-served order; if there is no message available the process is delayed until a message arrives.

Figure 2:
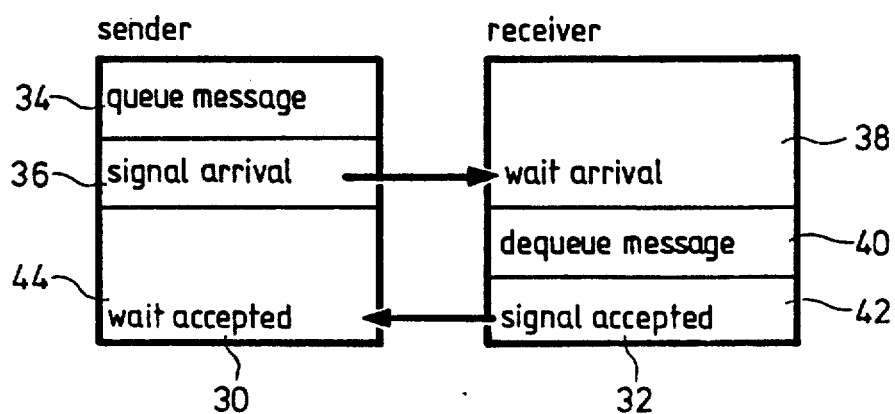
FIG. 2 symbolizes a language protocol.

FIG. 2 shows the sequence of steps executing the communication: the sender queues the message (34) and signals (36) to the destination that the message is available. The destination process may operate self-reliantly; if at any time it needs externally provided information, it starts to wait therefore (28). Sooner or later during the wait, maybe even at the very commencement thereof, the reception of the availability wait, maybe even at the very commencement thereof, the reception of the availability signal makes the destination dequeueing the intended message (40). Thereupon this is signalled to the sender (42) which then knows that no further waiting is necessary. The above is given for reference if a shared memory were indeed available. However, the machine considered, hereinafter has no shared memory, but only distributed memory. Moreover, in the machine model, opposite to the language model, we have asynchronous communication: a sending process delivers a message to the network, indicating the node to which it must be sent, and the process may continue. The network takes care of the routing of the message and delivers the message to the destination node. To make the message accessible to the destination process, a copy of the original message must be provided on the node of that destination process.

Figure 3:
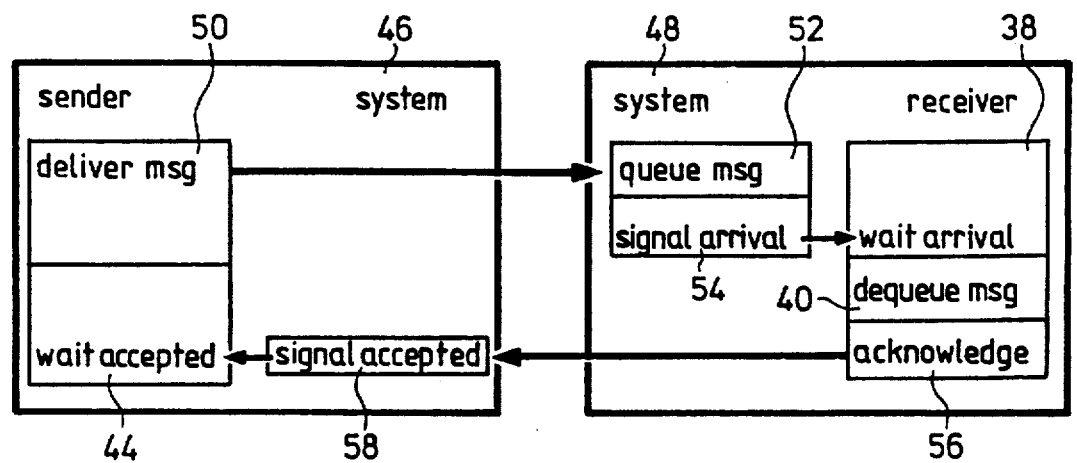
FIG. 3 symbolizes a second language protocol.

The primitives that are used in the protocols to abstract from the basic communication primitives of the machine are described in Machine Abstraction. The associated language protocol is shown in FIG. 3, wherein various steps that correspond to those in FIG. 2 have the same reference numbers. Block 46 refers to the source side, with local process -sender- and communication process -system-; block 48 refers to the destination side, with local process -receiver- and communication process -system-. Here, first the message -msg- is delivered (50) to the destination, where it is put in a queue (52). This is signalled to the local process (54), that was waiting for the arrival (38). Thereupon the message arrived is taken from the destination queue (40). This is then signalled as acknowledge to the communication process in the source (58), which thereupon terminates the waiting state of the source (44). The latter may then take up a new task.

PROCESS AND MESSAGE REPRESENTATION

The protocol descriptions use the following representations of processes and message buffers (identical for all protocols).

```
type prc =
  record
    head : ref msg;
    tail : ref msg;
    bufcnt : semaphore(0);
    continue : semaphore(0);
```

```
-continued
    end
```

The -head-, -tail- and -bufcnt- fields are used to implement a queue of message buffers for messages that have been sent to a process: -head- and -tail- are used to build a singly linked list of message buffers, -bufcnt- is used for synchronization on the queue. The semaphore -continue- is used to synchronize on other events; in principle, it need not be relevant to the present invention. The operations on semaphores are -wait- and -signal- (also called P and V) that are standard in the art of communicating processes. The initial value of a semaphore is given with its declaration.

The message representation:

```
type msg =
  record
    owner: ref prc;
    data : data;
    src : ref msg;
    next : ref msg;
  end
```

The owner field specifies the owner process, which always resides on the node where this message buffer is located; the -data- field contains the data of the message. The other fields are used by the communication protocols: -next- is used to build a linked list of message buffers, -src- refers to the original message buffer of which it is a copy.

The functions -claim_msg_buffer()- and -alloc_msg_buffer()- can be used to allocate message buffers on the node where they are executed. The first function blocks the executing process until a buffer can be allocated, the second returns -nil-when no message buffer is available.

The function -node_of(ref)- delivers the identification of the node where the referenced item resides (-ref- must be of type -ref msg- or -ref prc-). The function -is_local(ref)- returns true if the referenced item resides on the same node as where the function is invoked. The function -current process()- returns a reference to the process executing this function.

MACHINE ABSTRACTION

To abstract from low level machine details we introduce a language construct called Remote Asynchronous Call (RAC). In this section we give a sketch of its implementation. The syntax of RAC is as follows:

```
rac <procedure call> at <node-expr>;
```

The execution of a RAC first evaluates the parameter expressions of the procedure call. Then the node expression is evaluated, next an asynchronous message containing the parameters and procedure name is constructed and sent to that node. The destination node executes the involved procedure. The process that executes the RAC continues its operation immediately after sending the message.

For an efficient implementation of the RAC it is important to avoid dynamic process creation and dynamic message buffer allocation at the destination node. Therefore, we can keep one system process per node that accepts all incoming RAC-messages directly from the network and executes the procedure before accepting the next RAC-message. Such efficiency and fairness considerations imply that the called procedure may not contain blocking statements (-wait- and -claim—msg—buffer-).

Hence, abstracting from the implementation, the effect of executing a RAC-statement is that eventually the denoted procedure call will be executed on the node resulting from the at-expression. The process that executes the RAC-statement may continue before the denoted procedure is executed.

As an example of the RAC usage we show the implementation of the -put- operation, which is used in the protocols. The -put- operation adds a message M to the message queue of a process R, residing on node N. The message is put in the linked list and its presence is signalled to the semaphore -bufcnt-. Now, we first show the procedure -put—intern-, which does not use a RAC. -put—intern- assume that both R and the last message in the queue of process R reside on the same node (N) and that it is executed on that node.

```
proc put—intern(r:ref prc, m:ref msg)
begin
    if r→tail = nil
    then r→head := m;
    else link(r→tail, m);
    fi;
    r→tail := m;
    signal(r→bufcnt);
end
proc link(t, m:ref msg)
begin
    t→next := m;
end
```

The procedure -put—extern- assumes that it is executed on node N where R resides, and the last message buffer in the queue resides on another node. This means that the assignment in the -link- procedure cannot be executed on node N because the last message buffer in the queue cannot be accessed by node N (since memory is distributed): the -link- procedure must be executed on the node where the last message buffer (-r→tail-) resides.

```
proc put—extern(r:ref prc, m:ref msg)
begin
    if r→tail = nil
    then r→head := m;
    else
        rac link(r→tail, m) at node—of(r→tail);
    fi;
    r→tail := m;
    signal(r→bufcnt);
end
```

Since processes can only access locally stored data, RAC constructs must be used for all interactions with non-local data, and the algorithms heed thereto. In the sequel no explicit attention is paid to these design constraints.

To simplify the following, we assume that process switching only takes place in a limited set of procedure calls: synchronous scheduling. In this way, mutual exclusion between these procedure calls (scheduling points) is achieved automatically. Also, scheduling will only occur inside the -wait- and -claim—msg—buffer- operations.

DESTINATION BUFFERING

One strategy of buffering messages is to have some buffer space available at the node of the receiving process. That is, the message data is sent to the destination and buffered at the destination process.

A sender allocates and initializes a message buffer at the node of the destination process, puts it into the queue of the destination and waits for acknowledgement at its semaphore -continue-.

```
proc Send(r:ref prc, m:ref msg)
begin
    m→owner := current—process( );
    rac buffer—dest(r,m,m→data) at node—of(r);
    wait(m→owner→continue);
end
proc buffer—dest(r:ref prc,m:ref msg, d:data)
local b:ref msg;
begin
    b := alloc—msg—buffer( );
    b→owner := r;
    b→src := m;
    b→data := d;
    put—intern(r,b);
end
```

Buffer allocation using -alloc—msg—buffer- is assumed to succeed. The procedure -put—intern- has been presented in Machine Abstraction.

An accepting process waits for messages at its semaphore -bufcnt-. When a message has arrived, the process retrieves the message from its queue and signals the acceptance to the sender of the message.

```
proc Accept( ):ref msg
local m:ref msg;
    r:ref prc;
begin
    r := current—process( );
    wait(r→bufcnt);
    m := get—intern(r);
    rac acknowledge(m→src) at node—of(m→src);
    return(m);
end
proc get—intern(r:ref prc):ref msg
local m:ref msg;
begin
    m := r→head;
    if r→head = r→tail
    then r→tail := nil;
    else r→head := m→next;
    fi;
    return(m);
end
proc acknowledge(m:ref msg)
begin
    signal(m→owner→continue);
end
```

EVALUATION

Figure 4:
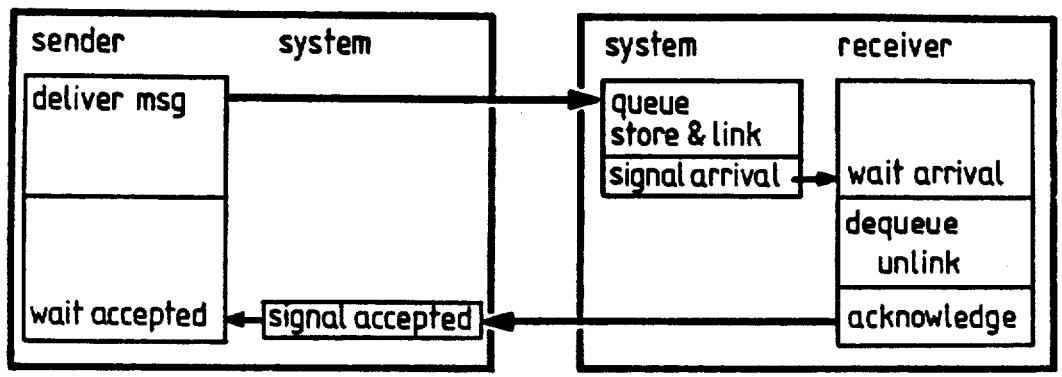
FIG. 4 shows a destination buffering protocol.

The destination buffering protocol has been shown in FIG. 4; it needs only two RAC's (which corresponds to the sending of two messages): the minimum for a synchronous communication action.

A disadvantage is that the protocol assumes a sufficient amount of memory available at the receiving node to buffer messages. The number of messages that have to be buffered on a node is indefinite and may give rise to memory overflow: the memory capacity would be less than required. The ensuing situation could in principle be indeterminate. In such a case the destination buffering protocol cannot be used and another buffering strategy is needed.

DISTRIBUTED BUFFERING

A different strategy is to buffer a message on the node of the sending process; a sender does not send the message, but only informs the destination that it wants to send a message.

```
proc Send(r:ref prc,m:ref msg)
begin
    m→owner := current_processs( );
    rac put_extern(r, m) at node_of(r);
    wait(m→owner →continue);
end
```

The procedure -put_extern- has been presented in Machine Abstraction.

An accepting process waits for the arrival of messages at its semaphore -bufcnt-. When a sender has signalled the presence of a message, the receiver allocates and initializes a message buffer, retrieves the message identification from the queue, requests to send the involved message and waits at its -continue- semaphore for the message arrival.

In this way, queueing information (-next- fields) becomes distributed over the nodes. Therefore, when sending a message, also the involved -next-field is conveyed to the destination (procedure -get_data-). However, there is no queueing information stored in the message buffer of the last message in the queue (-tail-). In that case the sent queueing information must be ignored. When the last message is retrieved from the queue (-is_tail- holds) the queue is set to empty (-r→tail:=nil-) before the next scheduling point: the -wait(r→continue)- statement. This is required since a next message can arrive during this wait statement (that message must be queued as the new first message and not linked to the message being requested).

When the message data arrives it is stored in the message buffer that has been allocated by the destination, which subsequently is activated. The destination updates the queue information and signals the message acceptance to the sender.

```
proc Accept( ):ref msg
local m:ref msg;
    r:ref prc;
begin
    r := current_process( );
    wait(r→bufcnt);
    m := get_extern(r);
    rac acknowledge(m→src) at node_of(m→src);
    return(m);
end
proc get_extern(r:ref prc):ref msg
local m, b:ref msg;
    is_tail:bool;
begin
    b := claim_msg_buffer( );
    m := r→head;
    b→src := m;
    b→owner := r;
    is_tail := (r→head = r→tail);
    if is_tail then r→tail := nil; fi ;
    rac get_data(m, b) at node_of(m);
    wait(r→continue);
    if not is_tail
    then r→head := b→next;
    fi;
    return(b);
end
```

```
proc get_data(m, b:ref msg)
begin
    rac put_data (b, m→data, m→next) at node_of(b);
end
proc put_data(b:ref msg, d:data, n:ref msg)
begin
    b→data := d;
    b→next := n;
    signal(b→owner→continue);
end
```

EVALUATION

Figure 5:
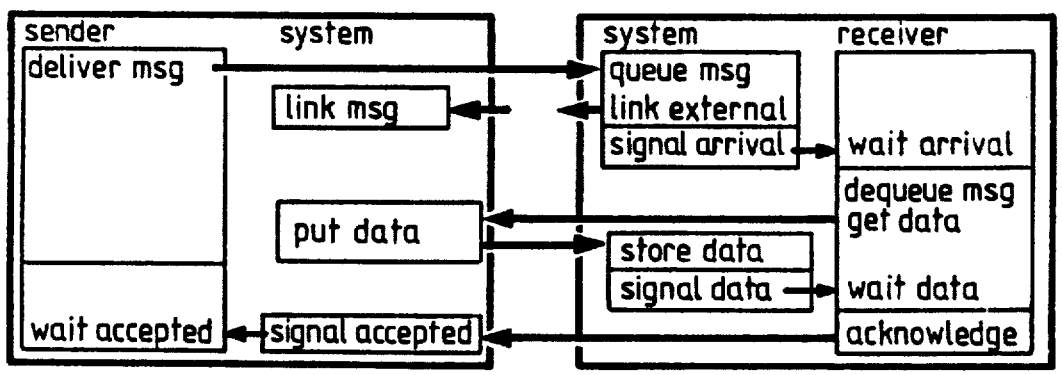
FIG. 5 shows a distributed buffering protocol.

The protocol is shown in FIG. 5; it is robust for memory overflow because the message buffer is allocated by the destination process. During memory overflow the accepting process will be blocked in the -claim_msg_buffer- function until the overflow situation has been solved by the underlying operating system.

A disadvantage of this distributed buffering protocol is that it needs at least four RAC's for a synchronized communication action: twice as much as in the destination buffering protocol. In certain cases, the -link external- network operation must be executed in addition. When the receiver's queue is empty, the latter operation is not effected.

OPTIMAL BUFFERING

Hereinafter an improved buffering protocol will be explained that combines the advantages of those of both FIG. 4 and FIG. 5. Nearly always it can do with only two network operations per message transmitted. On the other hand it is fully robust against memory overflow. The protocol has been designed in such a way that it tries first to buffer a message at the receiver (destination buffering). When that is not possible, the message buffering will take place at the sender (distributed buffering).

A process executing a -send- will always send the message to the receiver and wait for the acknowledgement. When at the destination a message buffer can be allocated the message is buffered at the destination. If that is not possible, the distributed buffering approach is followed. In that case, the message queue consists of both locally and non-locally buffered messages. The lengths of the queue parts are a priori unspecified. The non-locally buffered messages may be present at one or at more different nodes.

```
proc Send(r:ref prc,m:ref msg)
begin
    m→owner := current_process( );
    rac buffer_obp(r, m, m→data) at node_of(r);
    wait(m→owner→continue);
end
proc buffer_obp(r:ref prc, m:ref msg, d:data)
local b:ref msg;
begin
    b := alloc_msg_buffer( );
    if b = nil
    then put(r,m);
    else b→src := m;
        b→owner := r;
        b→data := d;
        put(r,b);
    fi;
end
proc put(r:ref prc, m:ref msg)
begin
    if is_local(r→tail)
    then put_intern(r,m);
```

```
    else put_extern(r,m);
    fi;
end
```

A receiver waits for a message at its -bufcnt- semaphore. When the queue is not empty, the first element in the queue is tested whether it is buffered locally or not. When it is buffered locally, the protocol behaves according to the destination buffering protocol, otherwise the distributed buffering protocol is followed.

```
proc Accept( ):ref msg
local m:ref msg;
    r:ref prc;
begin
    r := current_process( );
    wait(r→bufcnt);
    m := get(r);
    rac acknowledge(m→src) at node_of(m→src);
    return(m);
end
proc get(r:ref prc):ref msg
begin
    if is_local(r→head)
    then return(get_intern(r));
    else return(get_extern(r));
    fi;
end
```

EVALUATION

As long as there is sufficient memory on the node of the receiver, the destination buffering protocol is followed. In that case the protocol gives rise to the minimum number of network transfers (i.e. only two per message).

The protocol executes according to the distributed buffering protocol in case that the node of the receiver has insufficient memory for message buffering. As a consequence, the number of network transfers is increased (to four per message).

Figure 6:
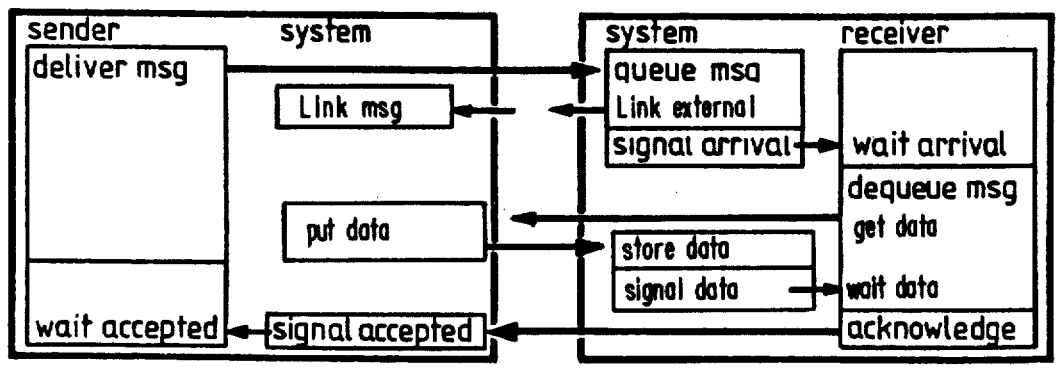
FIG. 6 shows a combined buffering protocol.

Once the situation occurs that the protocol starts behaving like the distributed buffering protocol, the efficiency of the inter-node communication decreases. But after a long enough period—during which the message-arrival rate does not exceed the message-consumption rate, to process the non-local parts of the queue—the system will return to the former status of using the destination buffering protocol. The protocol is shown in FIG. 6; the hatched parts representing the -distributed buffering- feature.

IMPLEMENTATION SPECIFICS

The above communication system may be implemented on various hardware realizations. In particular, it may prove necessary for certain computer systems to realize one or more of the following extensions that, however, do not subtract from the principle of the present invention. However, they represent the best mode contemplated by the inventors, in view of other requirements and degrees of freedom specified for the network.

NON ORDER PRESERVING NETWORK

In such a network it is not guaranteed that the order in which the RAC statements are executed on a node is the same as in which the corresponding procedures are executed. In the OBP the execution of -link- and -get_data-may be interchanged and hence require additional synchronization. For brevity the latter synchronization is not specified further.

PACKET SWITCHING NETWORK

The network can only pass messages of a limited size: packets. When the data size exceeds this limit additional RAC's are necessary.

At the destination the RAC-invocations must reconstruct the original data: re-assembly. Because of the risk of memory overflow, the memory for the re-assembly administration must be pre-allocated and a distributed management is required.

Note that the non-order-preserving property of the network implies that the invocation of procedures corresponding to a single message can occur in any order.

ADA -LANGUAGE- LIKE RENDEZ-VOUS MECHANISM

The acknowledgement of a message can be postponed until the rendez-vous terminates. The -acknowledge- parameter list is extended with a data parameter containing the result of the rendez-vous which will be delivered to the sender.

ASYNCHRONOUS MESSAGE PASSING WITH PRODUCTION SPEED CONTROL

The speed control mechanism tries to ensure that the number of sent messages which are not accepted by the destination will not exceed a certain limit (to manage the amount of buffer-space). The implementation uses a counter that is incremented when a message is sent and decremented when the message is accepted. When a process wants to send asynchronously and the counter exceeds the limit, the process will be blocked until the counter becomes less than the limit, or the period of blocking exceeds a certain maximum. The resulting variant of the OBP replaces the -acknowledge- procedure (not necessary for asynchronous communication) with a procedure for decrementing the counter.

SELECTIVE ACCEPTANCE

In various computer languages, notably in object-oriented languages, messages are typed and a receiving process may selectingly state which type of message it is presently willing to accept. This implies that a process has a message queue per message type and a parameter must be added to the -get- function indicating the queues from which a message may be accepted. When no message is available the -get- function blocks until an appropriate message arrives.

CONCLUSIONS

We have indicated that it is possible to design a communication protocol from simple standard protocols, that can be used in distributed systems with non order preserving, packet-switching networks, using programming languages with sophisticated primitives such as asynchronous and synchronous message-sending, and selective consumption of messages by accepting processes.

The optimized buffering protocol ensures that message passing is done very efficiently when there is sufficient memory; when message passing incidentally gives rise to memory-overflow, the program will not be aborted but can continue. The negative effect of memory-overflow on execution performance will fade away once the overflow situation is resolved.

We claim:

1. A multiprocessor computer system with distributed memory and an interprocessor communication mechanism, said system comprising for transmitting a message from a sender node to a receiver node:
   (a) in the sender node
      (I) first local communication process means,
      (II) sender process means for delivering a message,
      (III) means for requesting a second local communication process means in the receiver node to queue said message;
   (b) in the receiver node, said second communication process means, including
      (I) first detecting means for detecting a queuing request from said requesting means,
      (II) a first local memory facility,
      (III) inspection means for inspecting the first local memory facility to determine whether the first local memory facility is available for storing said message,
      (IV) local queuing control means for, if said first local memory facility is available, receiving and queuing said message to a local position of a waiting queue, which local position is in said first local memory facility, and for generating an arrival signal for said message, and for sending an acknowledge signal to said sender node,
      (V) a receiver process means, coupled to receive said arrival signal,
      (VI) non-local queueing control means for,
         (A) if said first local memory facility is not available, arresting and queueing said message to a non-local position of the waiting queue, which non-local position is in a second local memory facility of the sender node, and
         (B) generating a pendency signal with respect to said message to the receiver process means;
      (VII) chaining means for, under control of any output signal of said detecting means, signalling, to an applicable local communication process of any node containing a most recent preceding message of the waiting queue, a link indication signal identifying the node containing said message, whereby said message becomes a next successor message in the waiting queue, and whereby when the first local memory facility is not available said waiting queue extends over a plurality of nodes;
      (VIII) second detecting means, in the receiver process means, for after receiving either said arrival or said pendency signal, accessing a least recently activated position of the waiting queue and for detecting whether the least recently activated position is local or non-local;
      (IX) first dequeueing means for, if said least recently activated position is local, dequeueing and accepting from said waiting queue, the message in said least recently activated position for processing in said receiver processing means;
      (X) second dequeueing means for, if said least recently activated position is non-local,
         (A) dequeueing the message in said least recently activated position by controlling an applicable communication process means of any node containing the least recently activated position of the queue to present the message in said least recently activated position;
         (B) accepting the message for said receiver processing means from said least recently activated position;
         (C) reactivating said second detection means until the queue be empty; and
      (XI) acknowledge means for, after said accepting, transmitting an acknowledge signal to an applicable sender node.

2. A method for interprocessor communication, in a multiprocessor communication system with distributed memory, comprising the steps of:
   (a) producing a message in a sender process within a first local communication process in a sender node;
   (b) requesting a second local communication process in a receiver node to queue said message;
   (c) in the second local communication process of the receiver node, detecting the queueing request;
   (d) inspecting a first local memory facility in said receiver node to determine whether the first local memory facility is available for storing said message;
   (e) if said first local memory facility is available,
      (I) accepting and queuing said message to a local position of a waiting queue in said first local memory facility; and
      (II) signalling a receiver process of the receiving node of the arrival of said message;
   (f) if said first local memory facility is not available, retaining said message in a second, non-local position of the waiting queue which is located in a second local memory facility in the sender node;
   (g) signalling, to a local communication process which contains a most recent pending message of the waiting queue, a link indication identifying the node containing said message, whereby said message becomes a next successor message in the waiting queue and whereby if said first local memory facility is not available, said waiting queue extends over a plurality of nodes;
   (h) accessing, by said receiver process in the receiver node, a least recently activated message of the waiting queue;
   (i) detecting whether the least recently activated message is local or non-local to the receiver node;
   (j) if the least recently activated message is local to the receiver node, dequeueing and accepting the least recently activated message from said waiting queue for processing by the receiver process;
   (k) if the least recently activated message is non-local to the receiver node,
      (I) controlling an applicable communication process of the node containing the least recently activated message to dequeue and present the least recently activated message;
      (II) accepting the least recently activated message by the receiver process;
   (l) processing the waiting queue until it is empty;
   (m) after accepting any transmitted message, transmitting an acknowledge message from the receiver node to an applicable sender node.

3. The method of claim 2 wherein
   (a) said producing step comprises delivering said message to the first local communication process; and
   (b) said requesting step is performed within the first local communication process.

4. A method as claimed in claim 2 or 3, wherein said queueing is order preserving.

5. The method of claim 2 or 3 wherein step (e) (I) requires two network operations.

6. The method of claim 2 or 3 wherein step (e) (I) requires four network operations.

7. The method of claim 2 or 3, comprising the step of maintaining a second waiting queue in the receiver node for storing a second message having a second message type.

8. A method for transmitting and storing an interprocessor communication, in a multiprocessor communication system with distributed memory, comprising the steps of:
 (a) producing a message in a sender process within a first local communication process in a sender node;
 (b) requesting a second local communication process in a receiver node to queue said message;
 (c) in the second local communication process of the receiver node, detecting the queueing request;
 (d) inspecting a first local memory facility in said receiver node to determine whether the first local memory facility is available for storing said message;
 (e) if said first local memory facility is available,
  (I) accepting and queuing said message to a local position of a waiting queue in said first local memory facility; and
  (II) signalling a receiver process of the receiving node of the arrival of said message;
 (f) if said first local memory facility is not available, retaining said message in a second, non-local position of the waiting queue which is located in a second local memory facility in the sender node; and
 (g) signalling, to a local communication process which contains a most recent pending message of the waiting queue, a link indication identifying the node containing said message, whereby said message becomes a next successor message in the waiting queue and whereby if said first local memory facility is not available, said waiting queue extends over a plurality of nodes.

9. A method for accessing a stored interprocessor communication in a multiprocessor system with distributed memory comprising the steps of:
 (a) accessing, by a receiver process in a receiver node, a least recently activated message of a waiting queue which links waiting messages for the receiver node, which waiting messages are stored in memory facilities local to a plurality of nodes;
 (b) detecting whether the least recently activated message is local or non-local to the receiver node;
 (c) if the least recently activated message is local to the receiver node, dequeueing and accepting the least recently activated message from said waiting queue for processing by the receiver process;
 (d) if the least recently activated message is non-local to the receiver node,
  (I) controlling an applicable communication process of a node containing the least recently activated message to dequeue and present the least recently activated message;
  (II) accepting the least recently activated message by the receiver process;
 (e) processing the waiting queue until it is empty; and
 (f) after accepting any transmitted message, transmitting an acknowledge message from the receiver node to an applicable sender node.

* * * * *